United States Patent [19]
Takano

[11] Patent Number: 5,790,922
[45] Date of Patent: Aug. 4, 1998

[54] IMAGE FORMING APPARATUS CONSTRUCTED TO HAVE A HIGH HEAT RADIATING EFFICIENCY

[75] Inventor: Tadashi Takano, Yokohama, Japan

[73] Assignee: Canon Kabushiki Kaisha, Tokyo, Japan

[21] Appl. No.: 812,496

[22] Filed: Mar. 7, 1997

[30] Foreign Application Priority Data

Mar. 11, 1996 [JP] Japan ................... 8-053080

[51] Int. Cl.[6] .................................................. G03G 21/20
[52] U.S. Cl. ................... 399/94; 347/263; 399/107; 399/130; 399/320
[58] Field of Search ................... 399/92, 94, 107, 399/110, 124, 125, 130, 320, 328–331; 347/152, 156, 263; 358/296, 300, 400

[56] References Cited

U.S. PATENT DOCUMENTS

| | | |
|---|---|---|
| 5,255,061 | 10/1993 | Matsuura et al. ............ 399/124 |
| 5,268,720 | 12/1993 | Saitoh et al. ............ 399/110 |
| 5,307,132 | 4/1994 | Tsuchiya ............ 399/92 X |
| 5,331,374 | 7/1994 | Abe et al. ............ 399/130 X |
| 5,436,698 | 7/1995 | Ohtaka ............ 399/130 X |
| 5,512,975 | 4/1996 | Kitsu et al. ............ 399/130 |

*Primary Examiner*—William J. Royer
*Attorney, Agent, or Firm*—Fitzpatrick, Cella, Harper & Scinto

[57] ABSTRACT

An image forming portion is arranged below a photosignal scanning portion. An original reading portion is arranged in the horizontal direction of the photosignal scanning portion. A fixing portion is arranged between the photosignal scanning portion and the original reading portion. A radiation duct having a recording paper ejecting portion is arranged above the fixing portion. Thus, an influence by the heat of the fixing portion on the photosignal scanning portion and image reading portion is eliminated. A second recording paper ejecting portion is provided below the original reading portion. By the selection of the second recording paper ejecting portion and the recording paper ejecting portion, the face-up paper ejection and the face-down paper ejection can be selected.

10 Claims, 6 Drawing Sheets

IMAGE FORMING APPARATUS CONSTRUCTED TO HAVE A HIGH HEAT RADIATING EFFICIENCY

BACKGROUND OF THE INVENTION

1. Field of the Invention

The invention relates to an image forming apparatus such as a facsimile or the like using an electric photographing system such as LBP recording, LED recording, or the like as image forming means.

2. Related Background Art

Hitherto, an image forming apparatus such as a facsimile or the like using an electric photographing recording has a construction as shown in FIG. 6. Among recording papers (sheets) stacked in a cassette portion 13, one sheet in the top layer is fed by a pickup roller 51 and is conveyed to an image forming portion 10 by a conveying roller 29. A laser scanner 9 is arranged at an upper position on the downstream side of the image forming portion 10 and a fixing portion 11 is arranged on the further downstream side. On the basis of an image signal, a laser beam is irradiated as a scanning light onto a photosensitive drum 10a by the laster scanner 9. In the image forming portion 10, the surface of the photosensitive drum 10a is uniformly charged by a primary charging device 10b. A scanning light is irradiated onto the surface by the laser scanner 9, so that a latent image is formed. The latent image is visualized by toner which is supplied from a developing agent roller 10c and is transferred onto a recording paper (sheet) P by a transfer charging device 10f. The toner image is fixed by a fixing portion 11 and the recording sheet P is ejected onto a paper ejection tray 52 by a pair of paper ejection rollers 11a.

An image reading portion 3 is located above a recording portion 4 with the above construction. Originals S are conveyed to a separating portion by a spare conveying roller 53 and a pressure contact arm 54 and are separated one by one by a frictional member 18 and a separating roller 19. The separated sheet is conveyed to a contact-type image sensor 7 by a paper feed roller 21 and a paper feed roller 22. Image information of the conveyed original S is read by the contact-type image sensor 7. After that, the original is ejected onto an original ejection tray 8 by paper ejection rollers 23 and 24.

In the conventional image forming apparatus mentioned above, the image forming portion 10 and fixing portion 11 are arranged in the lateral direction and a photosignal scanning portion as a laser scanner 9 is arranged at an oblique upper position between the image forming portion 10 and the fixing portion 11, thereby constructing a recording portion and forming a structure in which the original reading portion 3 is arranged above the recording portion.

The image forming apparatus with the above construction has the following drawbacks.

First, since the fixing portion 11 and laser scanner 9 are closely arranged, there is a possibility such that a defective image, a defective operation, and the like occur due to an influence by the heat of the fixing portion 11.

Particularly, in a scanning system using a rotation optical system like a laser scanner 9, a distortion by the heat largely exerts an influence on the scanning position and becomes a factor of the defective image. Since a mirror is rotated at a high speed, a temperature of a motor largely rises, so that the heat of the fixing portion 11 also becomes a factor of the occurrence of the defective operation for the motor.

Since the apparatus has the structure such that the image reading portion 3 is located above the recording portion and it is difficult for the heat to escape to the upper portion, it is necessary to use a fan for forcedly radiating the heat from the apparatus main body. There is also similarly an influence by the heat with respect to the image sensor 7 of the image reading portion 3. In the conventional construction, therefore, not only the fan for heat radiation is necessary but also it is necessary to form a wind path to efficiently guide the heat. The apparatus construction becomes complicated and those factors become a cause of an increase in costs in terms of the double meanings.

Second, in the conventional construction, the printed recording sheet P can be ejected in what is called a face-up state in which a print surface is discharge upwardly. In the face-up paper ejection, however, although there is an advantage such that the print contents can be confirmed during the paper ejection, the order of pages of the recording sheets P stacked on the tray is reversed. In order to rearrange the printed sheets in accordance with the original page order, there is considered a method whereby the printed recording sheet P is once reversed and is ejected in a face-down state or after the image information of all pages were once stored into a memory, original images are sequentially printed onto the sheets from the last page and the printed recording sheets are ejected from the last page. However, the former method has a drawback such that a space to eject and stack the recording sheets in a face-down state is necessary between the recording portion and the image reading portion and the size of apparatus increases. The latter method has a drawback such that in order to store the image information of tens of pages, a large memory capacity is needed and it results in an increase in costs.

SUMMARY OF THE INVENTION

It is an object of the invention to solve the above problems and to provide an image forming apparatus which doesn't exert any influence by the heat on a photosignal scanning portion and an image reading portion by using a construction of a high heat radiating efficiency without using a fan for heat radiation.

Another object of the invention is to provide an image forming apparatus which can selectively switch a face-down paper ejection and a face-up paper ejection without enlarging a size.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described hereinbelow with reference to the drawings.

Figure 1:
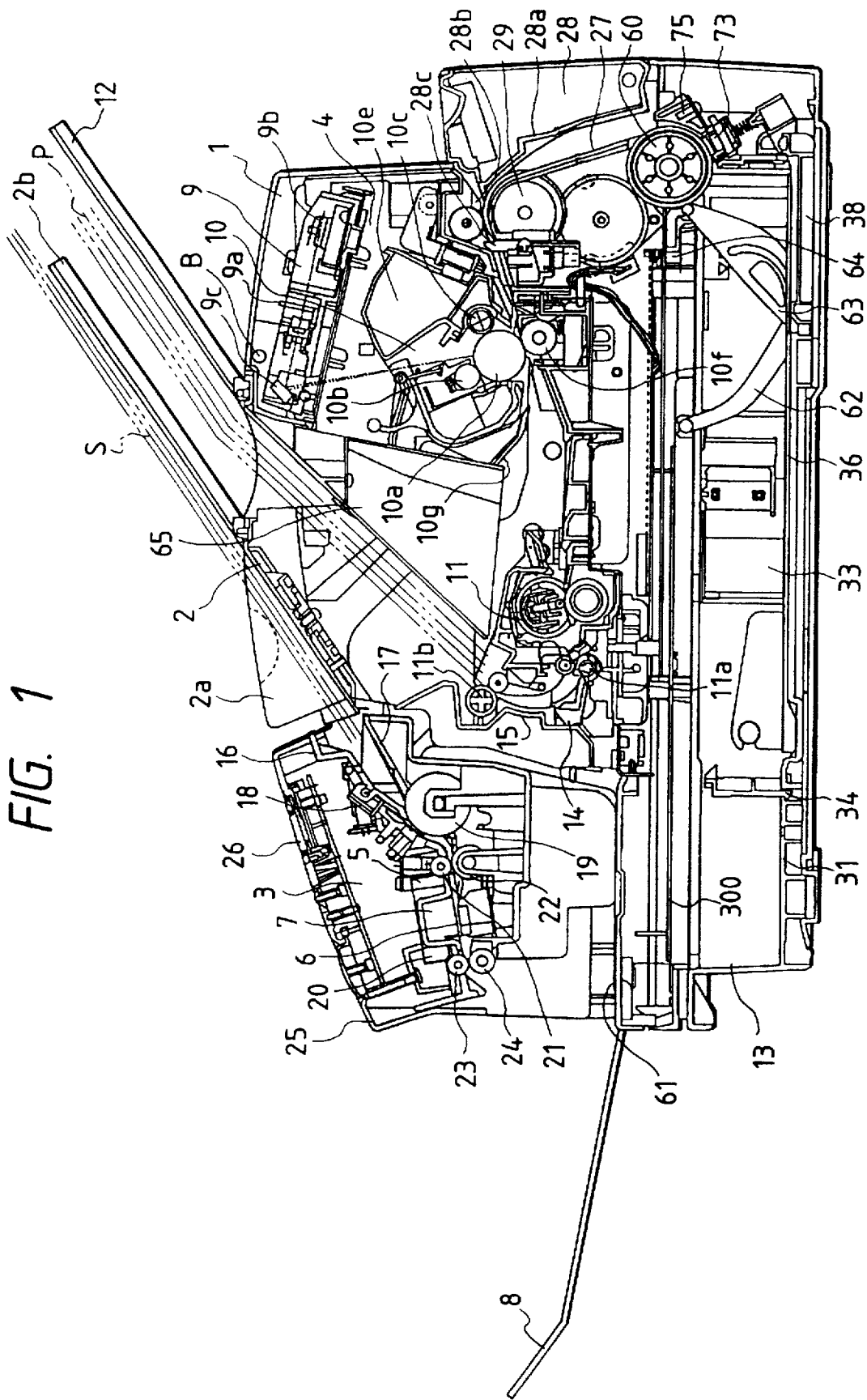
FIG. 1 is a cross sectional view of an image forming apparatus according to the first embodiment of the invention.
Figure 2:
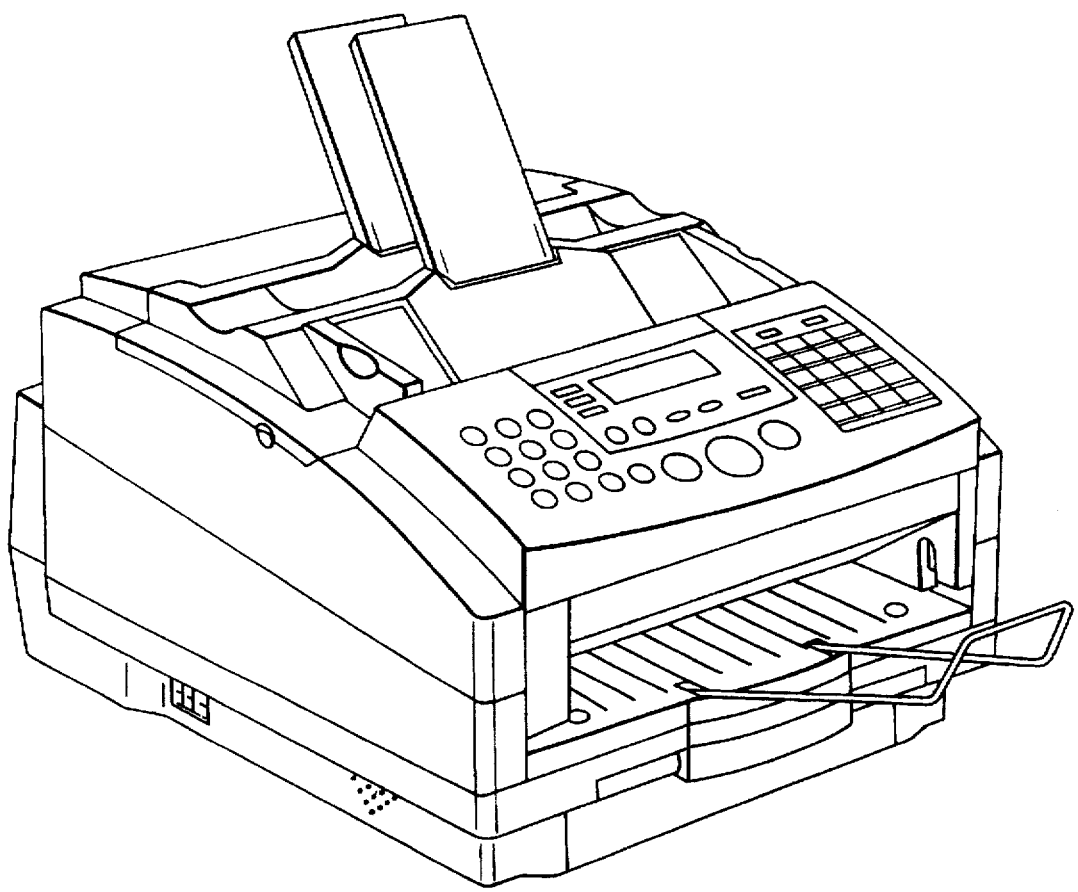
FIG. 2 is a perspective view of the image forming apparatus shown in FIG. 1.

FIG. 1 relates to the first embodiment of the invention and is a cross sectional view showing a facsimile apparatus as an image forming apparatus. FIG. 2 is a perspective view of the apparatus of FIG. 1. In FIG. 1, portions having functions similar to those in the conventional apparatus are designated by the same reference numerals.

In FIG. 1, reference numeral 1 denotes an apparatus main body; 2 a cartridge cover also serving as an original holding base plate constructed so as to enable a plurality of sheets of originals S to be stacked; 3 the image reading portion to read image information of the original S; 4 the recording apparatus main body comprising a laser beam printer; 5 an original conveying portion; 6 an original pressing portion 7 the contact-type image sensor; 8 the original ejection tray; 9 the laser scanner serving as a photosignal scanning portion; 10 the image forming portion (image forming means); 11 the fixing portion; 12 a face-down recording paper ejection tray; 13 the cassette portion; 14 a recording paper conveying path switching flapper; 61 a recording paper ejection cover; 65 a radiation duct; 15 a face-down guide; 16 an upper original guide; 17 a lower original guide; 25 an operation portion; 26 a display portion; 27 a conveyance guide; 28 a rear cover; and 29 the conveying roller.

As for a positional relation of each portion, the image reading portion 3 is arranged on one end side of the upper portion of the apparatus main body 1 and the laser scanner portion 9 is arranged on the other end side of the upper portion of the apparatus main body 1 in the horizontal direction of the image reading portion 3. The image forming portion 10 is arranged below the laser scanner 9 of the apparatus main body 1. The fixing portion 11 is arranged in an almost center portion of the apparatus main body 1 between the laser scanner 9 and the image reading portion 3.

In the image reading portion 3, the originals (sheets) S stacked on the original holding base plate 2 are first separated and fed one by one by the separating roller 19 which is in pressure contact with the frictional member 18. The separated original is subsequently, conveyed to the contact-type image sensor 7 by the paper feed roller 21 pressed by a pressing spring 20, the paper feed roller 22 which is in pressure contact with the paper feed roller 21, and the like. The original is pressed and adhered onto the contact-type image sensor 7 by the original pressing portion 6. The image information of the original S is read by the contact-type image sensor 7. After that, the original S is ejected onto the original ejection tray 8 by the paper ejection roller 23 pressed by the pressing spring 20 and the paper ejection roller 24 which is in pressure contact with the paper ejection roller 23. For such a period of time, the original S is guided by the upper original guide 16 and lower original guide 17.

The original holding base plate 2 is obliquely provided and the original S is guided by its weight to the separating roller 19, so that a compact construction in which the spare conveying portion is unnecessary is formed.

A slider 2a which can slide in the direction (width direction of the original S) perpendicular to the conveying direction of the original S is provided for the original holding base plate 2. Both sides of the originals S stacked on the original holding base plate 2 can be aligned by the slider 2a. When the original S is a longitudinal original, a situation such that a rear edge portion of the original S is overflowed from the original holding base plate 2 and hangs down can be prevented by an original tray 2b.

In the recording apparatus main body 4, a modulation signal is emitted from a laser beam generator 9a of the laser scanner 9 on the basis of the image signal which is generated from an electric control unit, a modulation beam is irradiated as a scanning light to the photosensitive drum 10a of the image forming portion 10 by a polygon mirror 9b, and image information is formed on the surface of the photosensitive drum 10a. The image information is transferred onto the recording paper (sheet) P fed from the cassette portion 13 to the image forming portion 10 and is fixed. After that, the recording sheet P is ejected onto the recording paper ejection tray 12.

The photosensitive drum 10a is integratedly assembled in a recording cartridge 10e together with the primary charging device 10b, developing agent roller 10c, and a cleaning blade (not shown) and is detachable to/from the apparatus main body 1. The surface of the photosensitive drum 10a is uniformly charged by the primary charging device 10b. When the scanning light which is sent from the polygon mirror 9b is irradiated onto the surface through a return mirror 9c, a latent image is formed on the surface. The latent image is visualized by toner which is supplied from the developing agent roller 10c.

The transfer charging device 10f is arranged around the photosensitive drum 10a of the image forming portion 10. The thermal fixing portion 11, pair of paper ejection rollers 11a, and a pair of face-down paper ejection rollers 11b are arranged on the recording paper conveying path on the downstream side than the photosensitive drum 10a.

After the toner image formed on the surface of the photosensitive drum 10a was transferred onto the recording sheet P by the transfer charging device 11f, it is conveyed along the conveyance guide 27. The toner image is fixed on the recording sheet by the thermal fixing portion 11. After that, the recording sheet P is sent to the pair of paper ejection rollers 11a.

The user can select either one of the two output styles (what is called a face-down paper ejection and a face-up paper ejection) of the recording sheet P. The face-down paper ejection is a style in which the print surface of the original ejected downwardly and the sheets are ejected so that the order of output pages is aligned. The face-up paper ejection denotes a style such that the print surface is turned upside up and the output contents can be also confirmed even during the paper ejection. The switching operation between both of those styles is executed by moving the recording paper conveyance path switching flapper 14 and switching the conveying path.

FIG. 1 shows a state of the face-down paper ejection. The recording sheet P which was turned upside up by the flapper 14 is guided along the face-down guide 15 and is ejected onto the radiation duct 65 integrated with the cartridge cover 2 and onto the face-down recording paper ejection tray 12 which continues to the radiation duct 65 by the pair of face-down paper ejection rollers 11b.

The radiation duct 65 is located over the fixing portion 11. The heat generated in the fixing portion is radiated upward along the radiation duct 65 by a natural convection and shields the image forming portion 10 (cartridge 10e) so that the heat doesn't enter therein.

When the user selects the face-up paper ejection, the direction of the flapper 14 is changed by a change-over lever (not shown), thereby ejecting the recording sheet to the recording paper ejection cover 61 side and the original paper ejection tray 8 side which continues thereto. The tray 8 serving as both of the face-up paper ejection tray and the original paper ejection tray has a wire-shape as shown in FIG. 2, thereby lightening a feeling as if there was an obstacle in front of the apparatus even when the user stands in front of the apparatus.

The cassette portion 13 is arranged in the bottom portion of the apparatus main body 1.

Reference numerals 62 and 63 denote actuators to detect the presence or absence of the recording sheet. When there is no sheet, by shielding optical recording paper sensor 64, each actuator detects the absence of the recording sheet. The recording sheets P stacked on a cassette 31 are come into pressure contact with a separating roller 60 by rotating a middle plate 36 upward by a lifter arm (feeding force applying means) 38 and are separated one by one by a separating pad 73 (frictional member separating method). The separated recording sheet is conveyed along a separating guide 75 and is, further, reversed by the conveying roller 29, a U-turn guide 28a on the cover side arranged on the rear cover 28 side, and a U-turn guide 28b on the main body side arranged on the apparatus main body 1 side.

Further, a front edge position of the recording sheet P during the feeding operation is detected by a registration sensor 28c. A timing for the paper feed and a timing for the image output are matched so that the front edge of the toner image formed on the photosensitive drum 10a and the front edge of the recording sheet P coincide. After that, the recording sheet P is conveyed between the transfer charging device 10f and the photosensitive drum 10a. An image is recorded on the lower surface side of the recording sheet P stacked in the cassette portion 13.

A side edge surface and a rear edge surface of the recording sheet P are restricted by a width restricting plate 33 and a rear edge restricting plate 34 which are movably attached in accordance with the size of recording sheet, thereby preventing the occurrence of an oblique motion and a non-feeding operation. The number of recording sheets which can be stacked is set to about 250 and the sheets can be pulled out in the front direction toward the apparatus main body 1 (front loading system). As sizes of recording sheets which can be stacked, there are three kinds of sizes of A4, letter, and legal. In FIG. 1, the rear edge restricting plate 34 is set to the position of the letter size.

Since the cartridge cover also functions as an original holding base plate, the radiation duct 65 is integratedly constructed, and the cover 2 is rotatably supported to the apparatus main body around a fulcrum B as a rotational center. By opening the cartridge cover 2, the recording cartridge 10e can be pulled out to the outside and can be exchanged.

The facsimile apparatus according to the embodiment has an interlocking mechanism for the cartridge cover 2. When the cartridge cover 2 is opened or the recording cartridge 10e is not set in the apparatus main body 1, the recording apparatus main body 4 do not operate.

A drum photosensitization preventing shutter 10g provided for the recording cartridge 10e is interlocked with the setting of the recording cartridge 10e into the apparatus main body 1. When the cartridge cover 2 is opened and the recording cartridge 10e is set into the apparatus main body 1, the shutter is opened, and when the recording cartridge 10e is taken out from the apparatus main body 1, the shutter is closed, thereby preventing that the photosensitive drum 10e is unnecessarily photosensitized.

When a paper jam occurs during the recording, by opening any one of the cartridge cover 2, rear cover 28, facedown guide 15, and cassette portion 13, the recording sheet P remaining in the apparatus main body 1 can be taken out.

Figure 3:
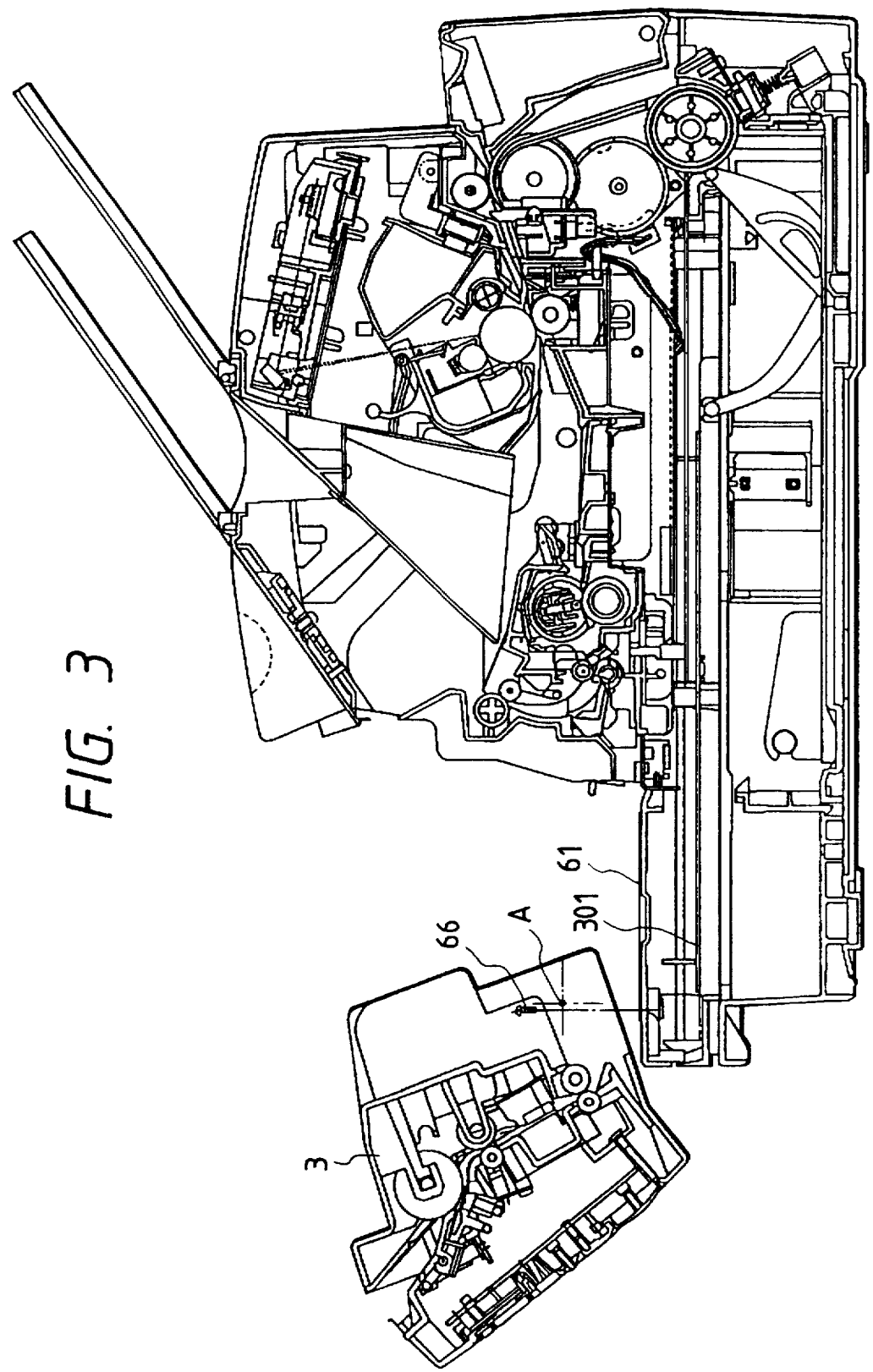
FIG. 3 is a cross sectional view when an image reading portion of the image forming apparatus shown in FIG. 1 is opened.

The image reading portion 3 is rotatably supported around a fulcrum A as a rotational center for the apparatus main body 1 as shown in FIG. 3 and can be opened by an angle of about 90° to 100° as shown in FIG. 3. The recording paper ejection cover 61 forms a recording paper face-up ejection portion together with the original paper ejection tray 8 and is fixed to the apparatus main body by a screw 66. The electric control unit is provided below the recording paper ejection cover. By rotating the image reading portion 3, the screw 66 can be easily removed. By removing the recording paper ejection cover 61, it is possible to access the electric control unit.

In the contact-type image sensor 7, the light is irradiated onto the image information surface of the original S from an LED array serving as a light source and the reflection light reflected from the image information surface is formed as an image onto a sensor device by a SELFOC lens (trade name), thereby reading the image information.

Figure 4:
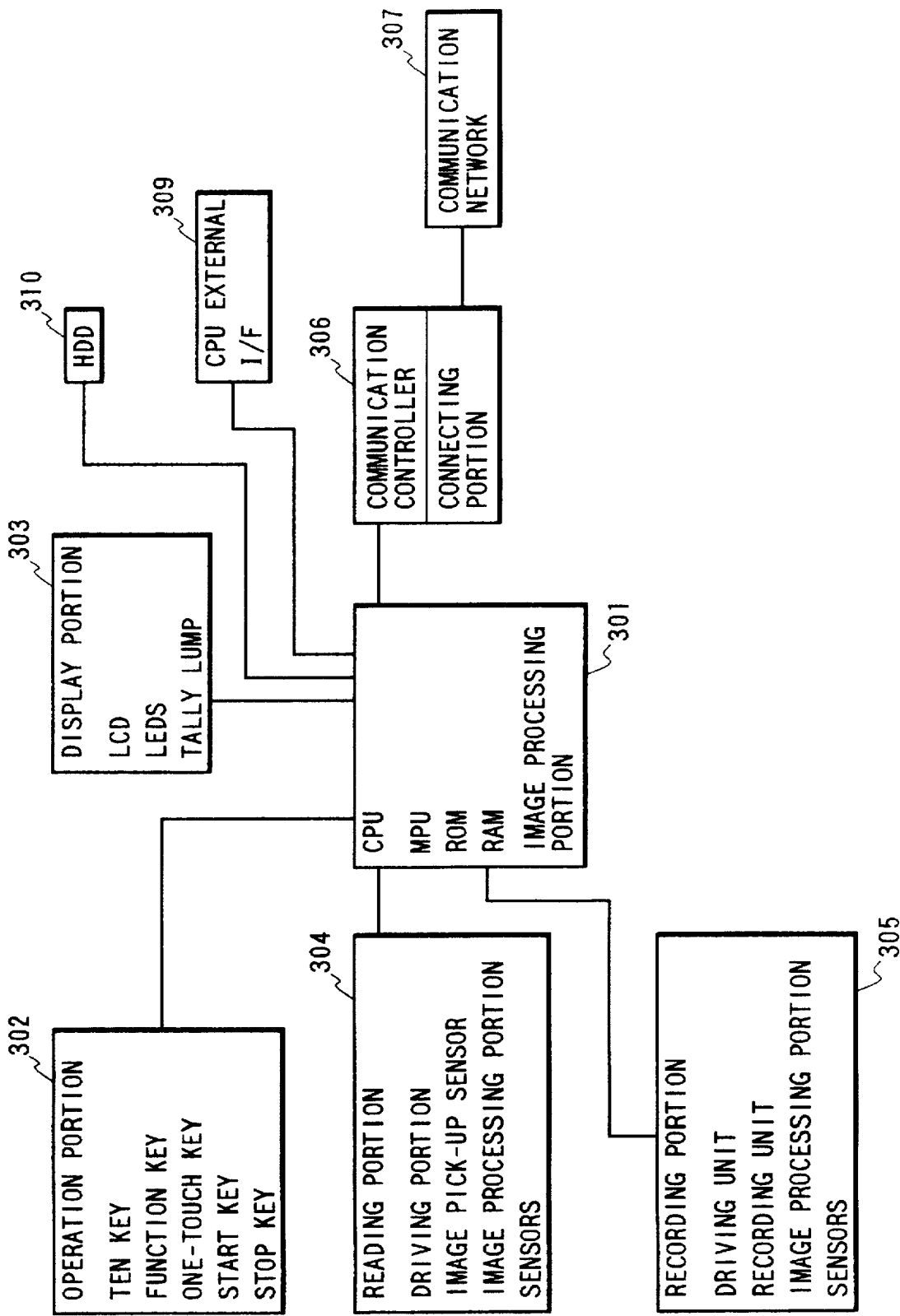
FIG. 4 is an electric control block diagram of the image forming apparatus shown in FIG. 1.

FIG. 4 is a block diagram of a control system 300 of a facsimile apparatus using a laser beam printer in the invention.

In the diagram, reference numeral 301 denotes a CPU to control the whole facsimile apparatus. The CPU 301 is constructed by: an MPU; an ROM to store a control program or the like of the MPU; an RAM which is used as a work area for various data processes or a temporary storing portion of image information; and an image processing portion to perform a zooming process of an image, a resolution conversion, or the like.

The CPU 301 has a calendar, timer function or the like with a well-known construction. A region to store important system set information such as one-touch key destination information, software switch information, and the like in the RAM is protected by a battery backup against an unexpected obstacle such as a power failure or the like. A control system of the facsimile apparatus has a construction such that the CPU 301 and following component elements 302–307, 309 and 310 are coupled through an interface.

An operation portion 302 comprises various key switches and the like such as ten-key, function keys, one-touch keys, start key, stop key, and the like.

A display portion 303 is constructed by: an LCD to display various messages; various LEDs to display a transmitting mode or the like; and the like.

A reading portion 304 is constructed by: a driving portion; an image pickup sensor to read an image; an image processing portion to perform a shading and a binarization of the read image; various sensors to perform a detection and the like of an original; and the like.

A recording portion 305 is constructed by: a driving portion of a recording motor or the like; a recording unit to perform a control or the like of a laser scanner and an electric photographing process; an image processing portion to perform a smoothing or the like of an image to be recorded; and various sensors to perform a detection of a recording sheet or the like.

A communication controller 306 to perform an originating call, a call reception, an encoding of image data, and the like has a connecting portion comprising an MODEM, an NCU, and the like and a communication network 307 is connected to the connecting portion.

A CPU external interface (I/F) 309 is an interface to directly perform transmission and reception of data to/from the CPU 301. For example, by connecting the CPU external interface 309 to a computer out of the apparatus through a line such as RS232C, SCSI, LAN, or the like, the apparatus is used as a scanner printer or the like of the external computer.

An HDD 310 is used as a non-volatile memory of a large capacity to store the image information or the like.

Figure 5:
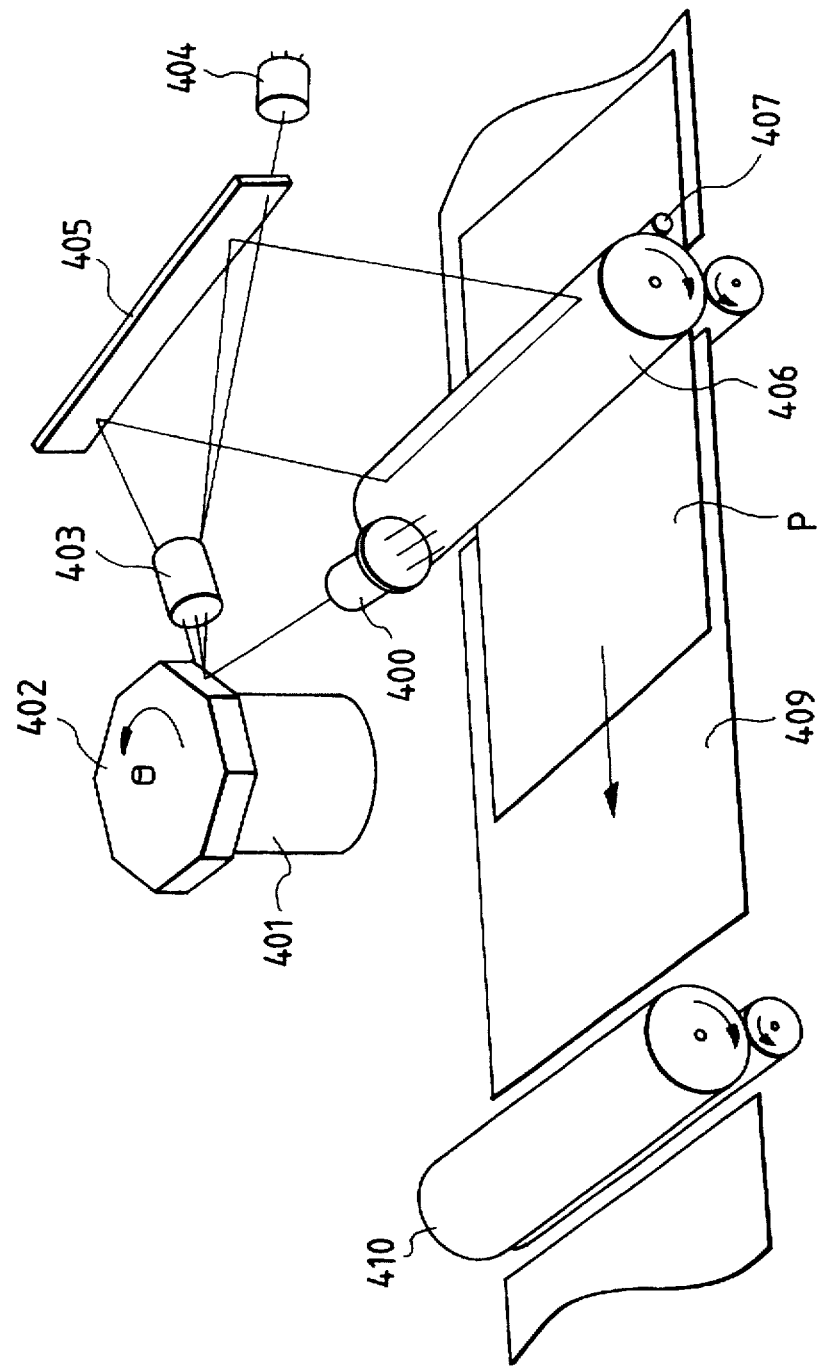
FIG. 5 is an explanatory diagram of the operation of a laser beam printer of the image forming apparatus shown in FIG. 1.
Figure 6:
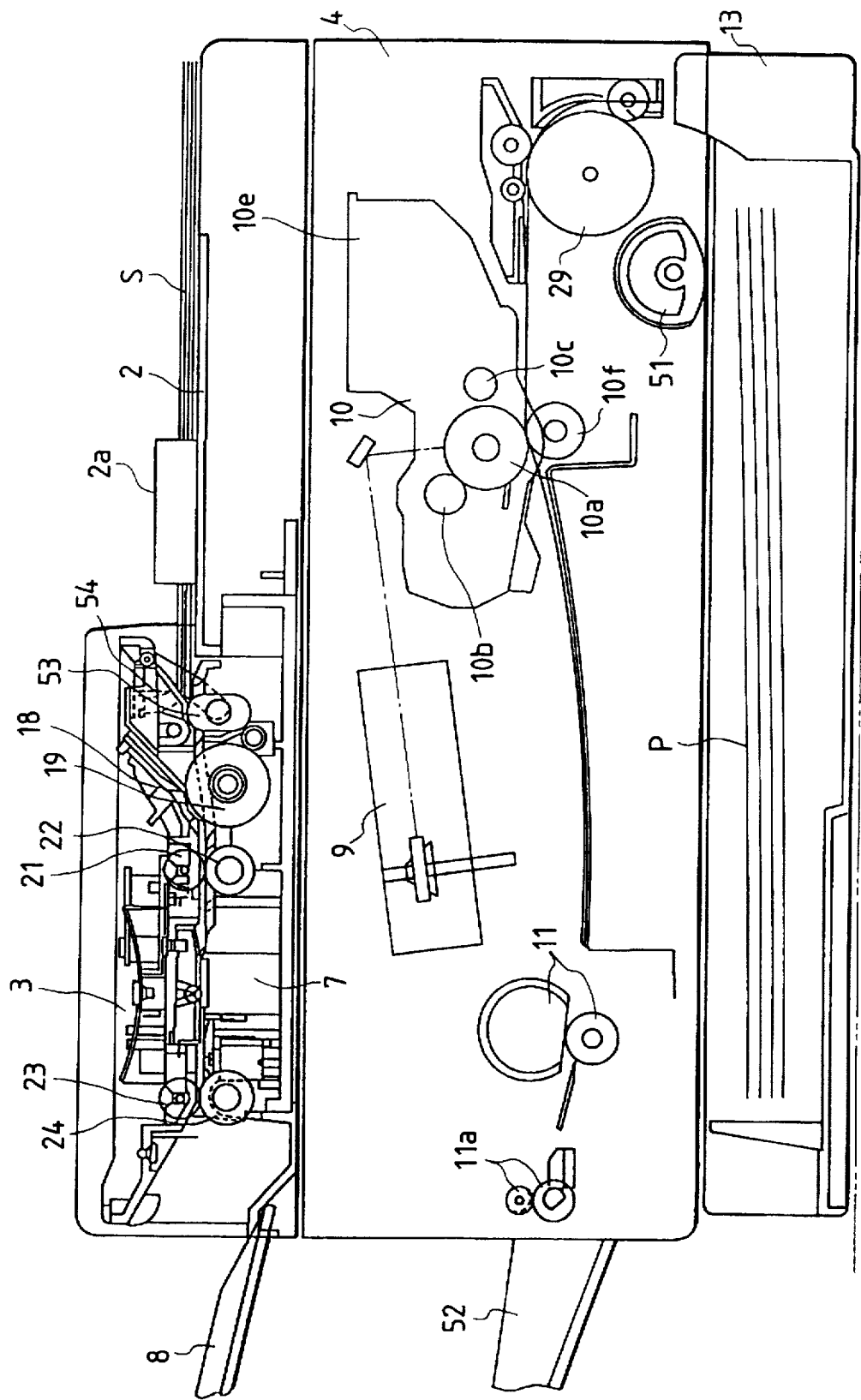
Fig. 6 is a cross sectional view of a conventional image forming apparatus.

The fundamental operation of the laser beam printer will now be described with reference to FIG. 5 showing a conceptual diagram.

In FIG. 5, reference numeral 400 denotes a semiconductor laser to light on/off a laser beam in accordance with the image data to be recorded; 401 a polygon motor; 402 a polygon mirror which is rotated by the polygon motor 401; 403 an optical system for performing an image formation, an inclination correction, or the like; 404 a photodetector; 405 a return mirror; 406 a photosensitive drum; 407 a developing device; P the recording sheet; 409 a conveying guide; and 410 a fixing device.

In the above construction, the laser beam emitted from the semiconductor laser 400 is first deflected by being reflected by the polygon mirror 402 and is irradiated onto the photosensitive drum 406 through the optical system 403 and return mirror 405 (main scan). In this instance, a head is searched by the photodetector 404 and an irradiating position is determined. For a period of time during which the main scan corresponding to one line is finished, the photosensitive drum 406 rotates by an angle corresponding to one line (sub scan).

The image formed on the photosensitive drum 406 as mentioned above is developed by the developing device 407 and is transferred onto the recording sheet P. The recording sheet P is conveyed along the conveying guide 409 and is fixed by the fixing device 410. After that, the recording sheet P is ejected to the outside of the apparatus main body 1.

The component elements of the sub scanning system such as photosensitive drum 406, developing device 407, fixing device 410, and the like are synchronously driven by a recording motor, a gear, a belt, and the like (not shown).

Although the above embodiment has been described with respect to the facsimile using the laser scanner as a photosignal scanning portion, a similar effect can be also obtained even if another scanning system, for example, an LED scanner is used. A similar effect is also derived even if another electric photographing system is used as a recording system.

According to the invention as described above, an image forming portion is arranged below the photosignal scanning portion, the image reading portion is arranged in the horizontal direction of the photosignal scanning portion, and the fixing portion is arranged between the photosignal scanning portion and the image reading portion. Thus, a defective image and a defective operation due to the heat can be prevented without being influenced by the heat of the fixing portion on the photosignal scanning portion and the image reading portion.

By providing the radiation duct above the fixing portion, the heat of the fixing portion can be efficiently radiated upward by natural convection. Therefore, there is no need to provide a fan for heat radiation and there is an effect such that the defective image which occurs when the heat enters the image forming portion is prevented.

Further, the radiation duct, recording paper ejecting portion, and original holding base plate are integratedly constructed and are rotatably supported from the apparatus main body. Therefore, although the apparatus is compact, the face-down paper ejection is realized and the cartridge integrated with the image forming portion can be easily taken out from the main body.

The image reading portion is rotatably supported from the main body. The detachable paper ejection cover constructing the recording paper ejecting portion when the paper is ejected in a face-up state is arranged below the image reading portion. The electric control unit is arranged below the paper ejection cover. Therefore, the paper ejection cover can be easily removed and it is possible to easily access to the electric control unit. Thus, the service person, user, or the like can easily perform an exchange of an ROM and an expansion of a D-RAM or the like. With the above construction, it is possible to realize a facsimile of a compact size in which the user can selectively switch the face-up paper ejection and the face-down paper ejection of the recording sheet.

What is claimed is:

1. An image forming apparatus comprising:

an image reading portion for conveying an original and reading image information;

a photosignal scanning portion for generating a photosignal on the basis of an image signal, said photosignal scanning portion being arranged in a horizontal direction of said image reading portion;

an image forming portion for forming a toner image onto a photosensitive drum by being irradiated with said photosignal and transferring said toner image onto a recording sheet, said image forming portion being arranged below said photosignal scanning portion; and a fixing portion for heating and fixing the toner image transferred onto said recording sheet, said fixing portion being arranged between said photosignal scanning portion and said image reading portion.

2. An apparatus according to claim 1, further including a radiation duct for radiating a heat of said fixing portion, and wherein said radiation duct is arranged between said photosignal scanning portion and said image reading portion.

3. An apparatus according to claim 1, further having a recording sheet ejecting portion to which the recording sheet from said fixing portion is ejected, and wherein said recording sheet ejecting portion is provided above said fixing portion.

4. An apparatus according to claim 3, further having an original holding base plate on which originals which are conveyed to said image reading portion are put, and wherein said original holding base plate is provided above said recording sheet ejecting portion.

5. An apparatus according to claim 3, further including another recording sheet ejecting portion to which the recording sheet from said fixing portion is ejected, and wherein said another recording sheet ejecting portion is provided so that said image reading portion is interposed by sandwiching between said another recording sheet ejecting portion and said recording sheet ejecting portion.

6. An image forming apparatus comprising:

an apparatus main body;

a reading portion for reading an original, said reading portion being arranged on one end side of an upper portion of said apparatus main body;

a photosignal scanning portion for generating a photosignal on the basis of an image signal, said photosignal scanning portion being arranged on the other end side of the upper portion of said apparatus main body;

an image forming portion for forming a toner image onto a photosensitive drum by being irradiated with said photosignal and transferring said toner image onto a recording sheet, said image forming portion being arranged below said photosignal scanning portion of said apparatus main body;

a fixing portion for heating and fixing the toner image transferred to said recording sheet, said fixing portion being arranged in an almost center portion of said apparatus main body; and a radiation duct for radiating heat of said fixing portion, said radiation duct being arranged between said photosignal scanning portion and said reading portion.

7. An image forming apparatus comprising:

an apparatus main body;

a reading portion for conveying an original and reading, said reading portion being arranged on one end side of an upper portion of said apparatus main body;

a photosignal scanning portion for generating a photosignal on the basis of an image signal, said photosignal scanning portion being arranged on the other end side of the upper portion of said apparatus main body;

an image forming portion for forming a toner image onto a photosensitive drum by being irradiated with said photosignal and transferring said toner image onto a recording sheet which is conveyed, said image forming portion being arranged below said photosignal scanning portion of said apparatus main body;

a fixing portion for heating and fixing said toner image transferred onto said recording sheet, said fixing portion being arranged in an almost center portion of said apparatus main body;

a first recording sheet ejecting portion to which the recording sheet from said fixing portion is ejected; and a second recording sheet ejecting portion to which the recording sheet from said fixing portion is ejected, said second recording sheet ejecting portion being provided so that said reading portion is interposed between said second recording sheet ejecting portion and said first recording sheet ejecting portion.

8. An apparatus according to claim 7, wherein said first recording sheet ejecting portion is positioned above said fixing portion and said second recording sheet ejecting portion is positioned in the horizontal direction of said fixing portion.

9. An apparatus according to claim 8, wherein said first recording sheet ejecting portion relates to a face-down paper ejection and said second recording sheet ejecting portion relates to a face-up paper ejection.

10. An apparatus according to claim 8, further including a switching member for selecting so that the recording sheet from said fixing portion is ejected to either one of said first recording sheet ejecting portion and said second recording sheet ejecting portion.

* * * * *

UNITED STATES PATENT AND TRADEMARK OFFICE
CERTIFICATE OF CORRECTION

PATENT NO. : 5,790,922

DATED : August 4, 1998

INVENTOR(S): TADASHI TAKANO

It is certified that error appears in the above-identified patent and that said Letters Patent is hereby corrected as shown below:

COLUMN 1

Line 22, "laster" should read --laser--.

COLUMN 2

Line 12, "discharge" should read --discharged--.

COLUMN 3

Line 13, "portion 7" should read --portion; 7--.

COLUMN 4

Line 23, "lib" should read --11b--.
    Line 28, "11f" should read --10f--.

COLUMN 5

Line 7, "are" should be deleted.
    Line 50, "do" should read --does--.

COLUMN 6

Line 21, "an" (second occurrence) should read --a--.
    Line 22, "an" should read --a--.
    Line 57, "an" (first occurrence) should read --a--.

UNITED STATES PATENT AND TRADEMARK OFFICE
CERTIFICATE OF CORRECTION

PATENT NO.   :  5,790,922

DATED        :  August 4, 1998

INVENTOR(S)  :  TADASHI TAKANO

It is certified that error appears in the above-identified patent and that said Letters Patent is hereby corrected as shown below:

<u>COLUMN 8</u>

```
Line 5,  "to" (second occurrence) should be deleted.
Line 7,  "an" (second occurrence) should be deleted.
Line 31, "a" should be deleted.
```

Signed and Sealed this

First Day of June, 1999

Attest:

Q. TODD DICKINSON

Attesting Officer

Acting Commissioner of Patents and Trademarks